(12) United States Patent
Furuta et al.

(10) Patent No.: US 10,058,908 B2
(45) Date of Patent: Aug. 28, 2018

(54) PROCESSING DEVICE AND PROCESSING METHOD

(71) Applicant: MITSUI HIGH-TEC, INC., Fukuoka (JP)

(72) Inventors: Masahiko Furuta, Fukuoka (JP); Kazufumi Yonemura, Fukuoka (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 498 days.

(21) Appl. No.: 14/352,201

(22) PCT Filed: Nov. 8, 2012

(86) PCT No.: PCT/JP2012/078981
§ 371 (c)(1),
(2) Date: Apr. 16, 2014

(87) PCT Pub. No.: WO2013/077193
PCT Pub. Date: May 30, 2013

(65) Prior Publication Data
US 2014/0250968 A1    Sep. 11, 2014

(30) Foreign Application Priority Data
Nov. 22, 2011  (JP) .................................. 2011-255296

(51) Int. Cl.
*B21D 22/06*    (2006.01)
*B21D 35/00*    (2006.01)
(Continued)

(52) U.S. Cl.
CPC .............. *B21D 45/04* (2013.01); *B21D 22/06* (2013.01); *B21D 28/02* (2013.01); *B21D 28/06* (2013.01);
(Continued)

(58) Field of Classification Search
CPC ...... B21D 45/02; B21D 45/04; B21D 45/003; B21D 28/02; B21D 43/00; B30B 13/00
See application file for complete search history.

(56) References Cited

U.S. PATENT DOCUMENTS 3,602,079 A * 8/1971 Carlson .................. B21D 28/02
83/637
2004/0250585 A1  12/2004 Bennett et al.
(Continued)

FOREIGN PATENT DOCUMENTS

CN    102218468    10/2011
JP    61-27520     2/1986
(Continued)

OTHER PUBLICATIONS

Human translation of JP04-075728, Translated Mar. 2017, 21 Pages.*
(Continued)

*Primary Examiner* — Teresa M Ekiert
*Assistant Examiner* — Gregory Swiatocha
(74) *Attorney, Agent, or Firm* — Greenblum & Bernstein, P.L.C.

(57) ABSTRACT

A processing device is provided which feeds a long plate body from an upstream side to a downstream side and sequentially carries out a press work including a blanking work to the long plate body. The processing device includes a plurality of stages provided along a feed direction of the long plate body, which has a die that applies the press work to the long plate body and a plurality of lifters provided along the feed direction of the long plate body which have lift-up parts that lift up the long plate body from the die. In the plurality of lifters, clearances by the lift-up parts of the
(Continued)

lifters arranged in the downstream side are set to be larger than the clearances by the lift-up parts of the lifters arranged in the upstream side.

10 Claims, 2 Drawing Sheets

(51) Int. Cl.
| | |
|---|---|
| *B21D 28/06* | (2006.01) |
| *B21D 28/02* | (2006.01) |
| *B21D 45/04* | (2006.01) |
| *B21D 45/00* | (2006.01) |
| *H02K 15/02* | (2006.01) |
| *H01F 41/02* | (2006.01) |

(52) U.S. Cl.
CPC ......... *H02K 15/024* (2013.01); *B21D 35/001* (2013.01); *B21D 45/003* (2013.01); *H01F 41/02* (2013.01)

(56) References Cited

U.S. PATENT DOCUMENTS

| | | |
|---|---|---|
| 2011/0236162 A1 | 9/2011 | Shikayama et al. |
| 2011/0252938 A1 | 10/2011 | Hirata |
| 2012/0279369 A1 | 11/2012 | Kimura et al. |

FOREIGN PATENT DOCUMENTS

| | | | | |
|---|---|---|---|---|
| JP | 4-75728 A | * | 3/1992 | ........... B21D 45/003 |
| JP | 11-104897 | | 4/1999 | |
| JP | 2001-204784 | | 7/2001 | |
| JP | 2003-200296 | | 7/2003 | |
| JP | 2003200296 A | * | 7/2003 | |
| JP | 3777435 | | 5/2006 | |
| TW | 201139006 | | 11/2011 | |

OTHER PUBLICATIONS

Human translation of JP 2003-200296, Translated Apr. 2017, 39 Pages.*
Office Action issued in China Counterpart Patent Appl. No. 201280057487.6, dated Aug. 7, 2015 , along with an English translation thereof.
Office Action issued in Japan Counterpart Patent Appl. No. 2011-255296, dated Nov. 4, 2015 , along with an English translation thereof.
Search report from E.P.O., dated Jun. 26, 2015.
China Office action, dated Jan. 23, 2015 along with an English translation thereof.
International Search Report and Written Opinion in PCT/JP2012/078981, dated Feb. 12, 2013, along with an English translation of the Search Report.

* cited by examiner

PROCESSING DEVICE AND PROCESSING METHOD

TECHNICAL FIELD

The present invention relates to a processing device and a processing method in which a work including a blanking work is applied to a sheet member by using a die having an upper die and a lower die.

BACKGROUND ART

In a processing device which sequentially conveys a sheet member from an upstream side to a downstream side and processes the sheet member, as disclosed in Patent Literature 1, a processing device is proposed which has mechanical lifters or air lifters respectively provided in stages. In the processing device of Patent Literature 1, the lifters are respectively provided in the stages. In this processing device, protruding heights of the lifters in their free states are the same. Spaces between the lifters adjacent in an advancing direction are the same. Further, widths of the lifters respectively provided in the stages are the same.

CITATION LIST

Patent Literature

Patent Literature 1: JP-A-11-104897

SUMMARY OF INVENTION

Technical Problem

However, as a blanking work is sequentially applied more to a wide sheet member, a rigidity of the sheet member is the more reduced. Accordingly, as the sheet member is conveyed to a more downstream stage, the sheet member is the more liable to be bent. Thus, the sheet member may be possibly caught in the processing device so that the sheet member is deformed. As a result, the processing device may be probably broken.

Thus, the present invention provides a processing device and a processing method which has no fear of damage due to a cause that the sheet member is caught in the processing device.

Solution to Problem

A processing device according to the present invention is a processing device for feeding a long plate body from an upstream side to a downstream side and sequentially carrying out a press work including a blanking work to the long plate body, the processing device including: a plurality of stages provided along a feed direction of the long plate body, wherein the plurality of stages has a die that applies the press work to the long plate body at the plurality of stages; and a plurality of lifters provided along the feed direction of the long plate body, wherein the plurality of lifters have lift-up parts that separate the long plate body by a prescribed clearance from the die, wherein the plurality of lifters are so configured that the clearance by the lift-up part of a lifter arranged in the downstream side is set to be larger than the clearances by the lift-up part of a lifter arranged in the upstream side.

The processing device may be configured so that a number of lift-up parts of the lifter arranged in the downstream side is larger than a number of lift-up parts of the lifter arranged in the upstream side.

The processing device may be configured so that the lift-up parts of the lifters are arranged in a width direction of the long plate body, and a width of the lift-up parts of the lifter arranged in the downstream side is set to be larger than a width of the lift-up parts of the lifter arranged in the upstream side.

The processing device may be configured so that two or more lift-up parts are provided along a width direction of the long plate body.

A processing method according to the present invention is a processing method for feeding a long plate body from an upstream side to a downstream side and sequentially carrying out a press work including a blanking work to the long plate body, wherein the long plate body fed to stages which respectively process the long plate body is lifted higher in the more downstream side by lifters respectively provided in the stages.

In the processing device and the processing method according to the present invention, there is no fear that the processing device may be possibly broken due to a cause that the long plate body is caught in the processing device when the long plate body is conveyed by the lifters.

DESCRIPTION OF EMBODIMENTS

Referring to FIG. 1 to FIG. 4, a processing device according to an embodiment of the present invention will be described.

Figure 1:
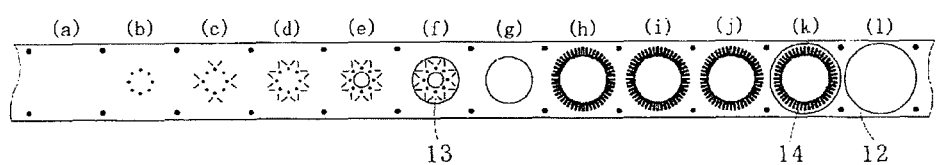
FIG. 1 is a plan view showing a processed state of a long plate body to which a processing device according to an embodiment of the present invention is applied.
Figure 2:
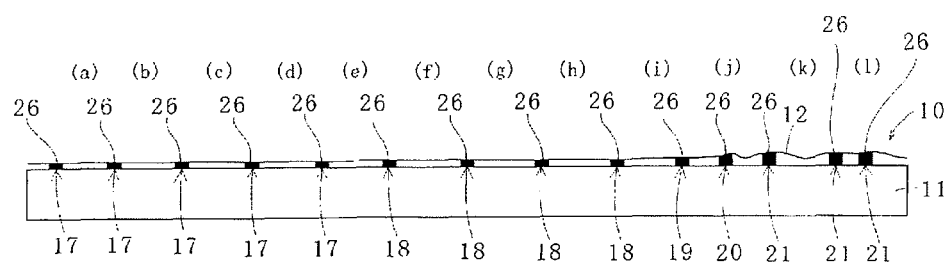
FIG. 2 is a sectional view of the long plate body and the processing device in process.
Figure 3:
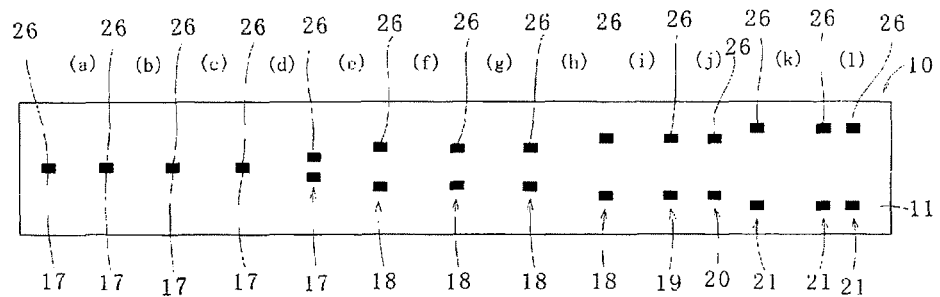
FIG. 3 is a plan view of a lower die corresponding to FIG. 2.
Figure 4:
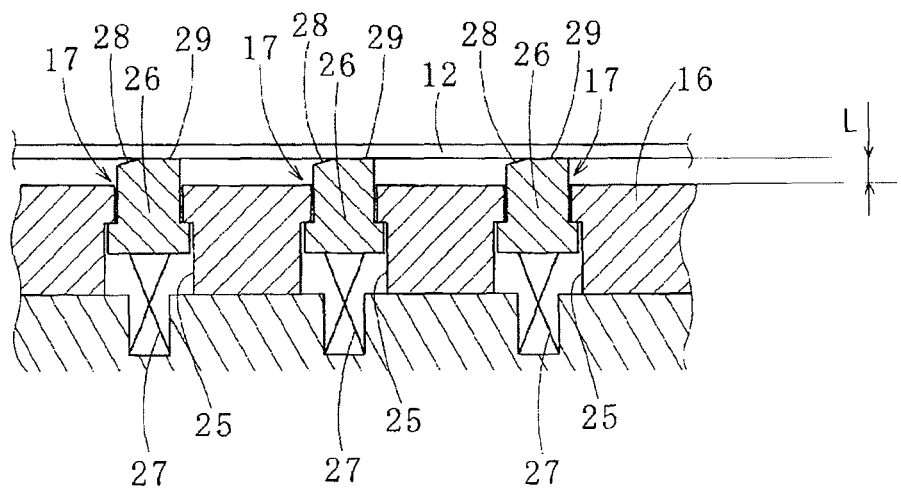
FIG. 4 is an enlarged view in section of peripheries of lifters of the processing device.

FIG. 1 is a plan view showing a processed state of a long plate body to which a processing device according to an embodiment is applied. FIG. 2 is a sectional view of the long plate body and the processing device in process. FIG. 3 is a plan view of a state corresponding to FIG. 2. FIG. 4 is an enlarged view in section of peripheries of lifters of the processing device.

A processing device 10 according to the present embodiment is a device of manufacturing a laminated iron core which can be preferably suitably used as a core or a stator of a motor. The laminated iron core is obtained by blanking a long electromagnetic steel plate (a long plate body) in a desired form.

As shown in FIG. 1 to FIG. 4, the processing device 10 according to the present embodiment includes a plurality of stages (a) to (l) having a common lower die (a die) 11 and upper dies arranged thereon which is not shown in the drawing. The plurality of stages (a) to (l) is arranged along a feed direction (a direction toward the right from the left in FIGS. 1 to 3) of a sheet member 12 as an object to be processed. In FIG. 1, signs (a) to (l) respectively show areas mounted on the stages (a) to (l). In FIGS. 2 and 3, sings (a) to (l) respectively show areas of the stages (a) to (l).

In the processing device 10, the sheet member 12 made of a long electromagnetic steel plate is sequentially conveyed respectively to the stages (a) to (l). Initially, in the stages (a) to (e), an unnecessary part is stepwise blanked to a prescribed form and a rotor iron core piece 13 is separated from the sheet member 12 in the stage (f). Thus, the rotor iron core piece 13 is obtained.

Further, the sheet member 12 from which the rotor iron core piece 13 is separated is subsequently conveyed to a downstream side to blank an unnecessary part to a prescribed form in the stages (h) to (k). In the stage (l) located in the most downstream side, a stator iron core piece 14 is separated from the sheet member 12. When the processing device 10 is used, the rotor iron core piece 13 and the stator iron core piece 14 are manufactured in such a way as described above.

The lower die 11 has a die not shown in the drawing and a die plate 16 (see FIG. 4).

In the die plate 16, a plurality of lifters 17 to 21 shown in FIG. 1 to FIG. 3 are respectively provided.

The lifters 17 to 21 are respectively provided in positions nearer to the stage (a) and in boundary positions of the stages (a) to (l). Further, the lifter 20 is provided in a central position of the stage (j) in the feed direction and the lifter 21 is provided in a central position of the stage (l) in the feed direction.

As shown in FIG. 4, the lifter 17 has a lifter pin (a lift-up part) 26 which moves upward and downward in a through-hole 25 provided in the die plate 16 and a spring 27.

The lifter pin 26 is a member which comes into contact with the sheet member 12 to apply such a force for lifting the sheet member 12 from the die plate 16. The spring 27 applies an upward force to the lifter pin 26 so that an upper surface of the lifter pin 26 may be lifted up to a prescribed height which protrudes from an upper surface of the die plate 16. Since the lifters 18 to 21 have the structures similar to the structure of the lifter 17, a detailed description thereof will be omitted.

The lifter pin 26 is pressed by a stripper and lowered as the upper die is lowered. When a prescribed part is blanked out from the sheet member 12 by the upper die and the lower die 11, the lifter pin 26 does not protrude from the upper surface of the die plate 16.

Further, the lifter pin 26 is lifted by a resilient force of the spring 27 as the upper die is lifted up, and protrudes from the upper surface of the die plate 16. Thus, after a blanking work of the sheet member 12 is finished respectively by the stages (a) to (l), the sheet member 12 is lifted up by the lifter pins 26 and separated upward from the die plate 16. Under this state, the sheet member 12 is conveyed to a downstream side by a conveyor not shown in the drawing.

In a top part of the lifter pin 26, an inclined surface 28 is provided which is inclined downward in an upstream side. In the downstream side of the inclined surface 28, a horizontal surface 29 is formed. Naturally, one or both of the inclined surface 28 and the horizontal surface 29 may be omitted. Alternatively, the top part of the lifter pin 26 may be configured in a circular arc form in section.

As shown in FIG. 3, the lifters 17 to 21 are respectively provided in the positions nearer to the stage (a) and in the boundary positions of the stages (a) to (l). In the present embodiment, a clearance L of the lifter 17 from the lower die 11 formed by the lifter pin 26 is set to 6 mm. A clearance L of the lifter 18 from the lower die 11 formed by the lifter pin 26 is set to 7 mm. A clearance L of the lifter 19 from the lower die 11 formed by the lifter pin 26 is set to 8 mm. A clearance L of the lifter 20 from the lower die 11 formed by the lifter pin 26 is set to 10 mm. A clearance L of the lifter 21 from the lower die 11 formed by the lifter pin 26 is set to 13 mm.

As described above, in the processing device 10 according to the present embodiment, the clearance L of the sheet member 12 from the die plate 16 formed by the lifter pin 26 of the lifter in a downstream side is set to be the same as or larger than the clearance L by the lifer pin 26 of the lifter in its upstream side.

The lifter pins 26 of the lifters 17 located in the positions nearer to the stage (a) and in the boundary positions of the stages (a) to (d)) are provided one by one at central positions in a direction of width of the lower die 11 (the die plate 16).

In the lifters 17 to 21 provided in the downstream side of the lifters 17 which include the lifter 17 provided in the boundary position of the stages (d) and (e), the two lifter pins 26 are respectively provided which are arranged in the width direction of the sheet member 12 (the direction which intersects at right angles to the feed direction).

The sheet member 12 is allowed to sequentially pass the stages (a) to (l) respectively by using the processing device 10 formed as described above, and the blanking work is applied to the sheet member 12 respectively in the stages (a) to (l). Every time that the sheet member 12 is blanked, a rigidity of the sheet member 12 is gradually reduced.

In the stages (a) to (d), a prescribed part is blanked from the sheet member 12 to form slots. However, the rigidity of the sheet member 12 is not much reduced. Accordingly, even by the lifter 17 which has only one lifter pin 26 in the width direction, both ends of the sheet member 12 in the width direction do not come into contact with the die plate 16, so that the sheet member 12 can be lifted up.

Then, in the stage (e), a part for a shaft hole of the rotor iron core piece 13 is blanked from the sheet member 12. Further, after the stage (f), the rotor iron core piece 13 is blanked. Thus, the rigidity of the sheet member 12 is gradually reduced. Accordingly, when the sheet member 12 is lifted, the sheet member 12 is liable to be bent. Then, as shown in FIG. 2, the end parts of the sheet member 12 in the width direction or a part between the lifter 20 in the upstream side and the lifter 21 in the downstream side may be possibly bent downward.

Even when the sheet member 12 is bent in such a way as described above, in the processing device 10 and a processing method according to the present embodiment, the clearances by the lifters 17 to 21 by the lifter pins 26 are set so as to be larger toward the downstream side. Thus, even when the sheet member 12 is bent downward in the downstream side, the sheet member 12 is lifted up higher by the lifters 17 to 21 respectively provided in the stages as the sheet member is fed the more to the downstream side. Thus, the sheet member 12 can be restrained from coming into contact with the die plate 16. Accordingly, when the sheet member 12 is lifted up by the lifters 17 to 21 and fed to the downstream side, the sheet member 12 can be restrained from being caught in or coming into contact with the processing device 10 including the lower die 11 or the lifter pins 26. The processing device 10 can be prevented from being broken.

Further, in the processing device 10 according to the present embodiment, the number of the lifter pins 26 of the lifters arranged in the downstream side is set to be larger than the number of the lifter pins 26 of the lifters arranged in the upstream side. Thus, as the sheet member is fed more to the downstream side, the sheet member 12 is supported the more by many support points, a bending is the more suppressed and the sheet member 12 can be the more assuredly prevented from coming into contact with the processing device 10.

In the lifters 17 to 21 which respectively have the two lifter pins 26 provided and arranged in the width direction of the sheet member 12 in the processing device 10 according to the present embodiment, a width of the lifter pins 26 of the lifter arranged in the downstream side is set to be larger than a width of the lifter pins 26 of the lifter arrange din the upstream side. Thus, even when the sheet member 12 fed to the downstream side is bent, the end parts thereof in the width direction can be prevented from coming into contact with the die plate 16.

Further, since the plurality of lifter pins 26 are provided, the lifter can support the sheet member 12 by the plurality of support points. Thus, the sheet member 12 does not come into contact with the die plate 16 and can be assuredly lifted up, so that the processing device 10 can be prevented from being broken.

The present invention is not limited to the above-described embodiment, and the structure thereof may be changed within a scope that does not change the gist of the present invention. For instance, the heights, the number, the widths and the spaces of the lifter pins are not limited to the above described numeric values, and may be changed depending on the form or size of the sheet member to be processed.

Further, in the above-described embodiment, both the rotor iron core piece and the stator iron core piece are blanked and formed from the sheet member. However, the present invention may be applied to a case that only one of them is formed. Further, in the stages of the downstream side, one or two or more lifter pins may be provided between the lifter pins arranged in the width direction of the sheet member.

In the above-described embodiment, an example is exemplified and described in which one lower die 11 is used in common respectively by the stages (a) to (l). However, the present invention is not limited to this example. The present invention may be applied to a case where an upper die and a lower die are provided in each of stages or to a processing device having a lower die or an upper die shared by a plurality of stages.

Further, in the above-described embodiment, an example is exemplified and described in which the lifters 17 to 21 are provided respectively in the upstream side and the downstream side of the stages (a) to (l). However, the present invention is not limited thereto. For instance, when the rigidity of the sheet member is high to some degree, stages which are not provided with the lifters 17 to 21 may be provided.

Further, in the above-described embodiment, the lifters 17 to 21 are exemplified and described which physically come into contact with the sheet member 12 to lift the sheet member. However, the present invention may be applied to a processing device provided with what is called an air lifter (a lift-up part) which blows gas to a sheet member to lift up the sheet member from a lower die 11.

Further, in the above-described embodiment, although the processing device 10 in which the blanking work is carried out in all the stages is described as an example, the present invention is not limited thereto. The present invention may be applied to a processing device which can carry out a press work such as a punching work or a bending work as well as the blanking work.

In the above-described embodiment, as the processing device 10, the device of manufacturing the laminated iron core is described as an example. The present invention is not limited thereto. For instance, the processing device may be applied to a device of blanking a lead frame used for electronic parts or a device of blanking a thin metal plate such as a blanking device for other precision components.

As mentioned above, the present invention is described in detail by referring to the specific embodiment. However, it is to be understood to a person with ordinary skill in the art that various changes or modifications may be made without deviating from the spirit and scope of the present invention.

The present application is based on Japanese Patent Application No. 2011-255296 filed on Nov. 22, 2011, the contents of which are incorporated herein by reference.

INDUSTRIAL APPLICABILITY

According to an aspect of the present invention, the processing device and the processing method can be provided in which when the long plate body is conveyed by the lifters, the long plate body can be restrained from being caught in the processing device when the long plate body is conveyed by the lifters, so that there is no fear of damage.

REFERENCE SIGNS LIST

10: processing device
11: lower die
12: sheet member
13: rotor iron core piece
14: stator iron core piece
16: die plate
17 to 21: lifter
25: through-hole
26: lifter pin
27: spring
28: inclined surface
29: horizontal surface

The invention claimed is:

1. A processing method for feeding a long plate body from an upstream position to a downstream position in a feed direction of the long plate body and sequentially carrying out press work including blanking work on the long plate body, the processing method comprising:
provifing a plurality of stages that respectively process the long plate body;
providing a plurality of lifters having lift-up parts along the feed direction, and a plural number of the lift-up parts being provided in each of the plurality of stages in the feed direction;
feeding the long plate body to the plurality of stages;
lifting the long plate body to the same height or higher in a more downstream position by the lift-up parts respectively provided in the plurality of stages such that at least the long plate body in a most downstream position is lifted higher than in a most upstream position; and
providing each of the plural number of the lift-up parts in a fmal stage of the plurality of stages to have an equal lifting height, and lifting the long plate body at the fmal stage such that each of the plural number of the lift-up parts in the fmal stage lift the long plate body an equal lifting distance.

2. The processing method according to claim 1, further comprising:
providing a number of lift-up parts of each lifter to be equal to or larger than a number of lift-up parts of the adjacent lifter arranged in the upstream position and at least the number of lift-up parts of the lifter at the most downstream position to be larger than the number of lift-up parts of the lifter in the most upstream position.

3. The processing method according to claim 2, further comprising:
providing two or more lift-up parts along a width direction of the long plate body that is transverse to the feed direction.

4. The processing method according to claim 1, further comprising:
providing the lift-up parts of the lifters to be arranged in a width direction of the long plate body that is transverse to the feed direction, and
providing a distance in the width direction between the lift-up parts of each lifter to be equal to or larger than a distance in the width direction between the lift-up parts of the adjacent lifter arranged in the upstream position, and at least the distance in the width direction between the lift-up parts of the lifter at the most downstream position to be larger than the distance in the width direction between the lift-up parts of the lifter in the most upstream position.

5. The processing method according to claim 4, further comprising:
providing two or more lift-up parts along a width direction of the long plate body that is transverse to the feed direction.

6. The processing method according to claim 4, further comprising:
providing the distance between the lift-up parts of the lifter to increase in a stepwise manner from the upstream position toward the downstream position.

7. The processing method according to claim 1, further comprising:
providing at least the lifter arranged in the most upstream position to have a single lift-up part centrally located in a width direction that is transverse to the feed direction of the long plate body.

8. The processing method according to claim 1, further comprising:
providing each of the plurality of lifters in a boundary position between the stages.

9. The processing method according to claim 1, further comprising:
providing the clearance by the lift-up part to increase in a stepwise manner from the upstream position toward the downstream position.

10. The processing method according to claim 1, further comprising:
providing the lift-up parts as lift pins that directly push up the long plate body.

* * * * *